United States Patent [19]
Seitz et al.

[11] Patent Number: 5,831,746
[45] Date of Patent: Nov. 3, 1998

[54] ENGRAVED AREA VOLUME MEASUREMENT SYSTEM AND METHOD USING PIXEL DATA

[75] Inventors: David R. Seitz, Vandalia; Curtis Woods, Centerville, both of Ohio

[73] Assignee: Ohio Electronic Engravers, Inc., Dayton, Ohio

[21] Appl. No.: 642,610

[22] Filed: May 3, 1996

Related U.S. Application Data

[63] Continuation-in-part of Ser. No. 415,638, Apr. 3, 1995, which is a continuation-in-part of Ser. No. 38,679, Mar. 26, 1993, Pat. No. 5,438,422, which is a continuation-in-part of Ser. No. 22,127, Feb. 25, 1993, Pat. No. 5,424,845, and Ser. No. 242,012, May 12, 1994, Pat. No. 5,492,057.

[51] Int. Cl.$^6$ ............................. B41C 1/04; H04N 1/40; G01B 11/28
[52] U.S. Cl. ........................... 358/299; 358/298; 356/379
[58] Field of Search ................... 358/298, 299, 358/448; 356/378–380; 382/141; 364/474.15, 474.16, 474.37

[56] References Cited

U.S. PATENT DOCUMENTS

| | | | |
|---|---|---|---|
| 2,493,628 | 1/1950 | Harley | 88/14 |
| 2,777,058 | 1/1957 | Boyajean | 250/27 |
| 2,874,479 | 2/1959 | Farber | 33/185 |

(List continued on next page.)

FOREIGN PATENT DOCUMENTS

| | | |
|---|---|---|
| 0595324 | 5/1994 | European Pat. Off. |
| 2012213 | 5/1994 | European Pat. Off. |

OTHER PUBLICATIONS

"Helio Klischograph K301 and K302 for Magazine Gravure Printing", Hell Graphic Systems, Inc., Dr. Ing. Rudolf. Hell GmbH, P.O. Box 6229, D–2300 Kiel 14, undated brochure.

"Helio Klischograph K304 for Packaging and Product Gravure Printing", Hell Graphic Systems, Inc., Dr. Ing. Rudolf Hell GmbH, P.O. Box 6220, D–2300 Kiel 14, undated brochure.

"Polishmaster High Precision Machining and Measuring Center for Gravure Cylinders", MDC Max Datwyler AG, CH–3368 Bleienbach/Schweiz, Switzerland, undated brochure.

The Gravure Association of America, *The Gravure Engraving Manual* (1987).

Balcom, *Basic Rotogravure* (1988).

Heimann GmbH, *Drucktechnische Bertung–Graphischer Handel* (Pamphlet, Hamm, Germany, 1984).

(List continued on next page.)

*Primary Examiner*—Eric Frahm
*Attorney, Agent, or Firm*—Jacox, Meckstroth & Jenkins

[57] ABSTRACT

A includes system and method for determining an actual volume measurement for an engraved area on a surface of a workpiece, such as a cylinder. The system and method is capable of capturing an image of an engraved area, determining a plurality of cross-section volumes for a plurality of cross-sectional areas using the image, and generating a plurality of volume values in response thereto. The system and method sum the volume for the plurality of cross-sectional areas to provide a total engraved area actual volume value. If necessary, the system and method causes an engraver to be adjusted during a set-up procedure or during real-time operation to ensure that the densities of the areas being engraved correspond to desired densities. A computer associated with the engraver utilizes an image to determine a stylus profile from which engraved area measurements can be determined. The computer further adjusts the engraved drive signal by applying a gamma correction curve if the actual measurements deviate from a desired measurement by more than a predetermined amount. The engraving system and method also adjusts the engraved drive signal to eliminate engraved areas having densities less than a predetermined amount in order to eliminate undesired "scum dots" or engraved areas having a density less than, for example, three percent of maximum density.

34 Claims, 12 Drawing Sheets

U.S. PATENT DOCUMENTS

| | | | |
|---|---|---|---|
| 2,943,564 | 7/1960 | Demer | 101/93 |
| 3,280,252 | 10/1966 | Lilien et al. | 178/6 |
| 3,612,753 | 10/1971 | Korman | 178/5.2 A |
| 3,652,992 | 3/1972 | Koll | 340/146.3 B |
| 3,769,455 | 10/1973 | De Vos et al. | 178/6.6 B |
| 3,770,888 | 11/1973 | De Vos et al. | 178/6.6 B |
| 3,784,739 | 1/1974 | De Vos et al. | 178/6.6 B |
| 3,876,829 | 4/1975 | Schreiber | 178/7.3 D |
| 3,904,816 | 9/1975 | Taudt et al. | 178/6 |
| 3,918,348 | 11/1975 | Runft | 90/11 R |
| 3,931,570 | 1/1976 | George et al. | 324/34 R |
| 3,937,873 | 2/1976 | Gastineau | 178/6.6 |
| 3,956,583 | 5/1976 | Pugsley | 178/6.6 R |
| 4,001,495 | 1/1977 | Tauszig | 358/294 |
| 4,003,311 | 1/1977 | Bardin | 101/426 |
| 4,007,362 | 2/1977 | Sindermann | 235/151 |
| 4,012,584 | 3/1977 | Gascoigne | 358/302 |
| 4,052,739 | 10/1977 | Wada et al. | 358/299 |
| 4,072,928 | 2/1978 | Wilder | 340/146.3 H |
| 4,075,662 | 2/1978 | Gall | 358/280 |
| 4,079,235 | 3/1978 | Froyd et al. | 364/107 |
| 4,126,821 | 11/1978 | Cannon | 318/696 |
| 4,240,118 | 12/1980 | Wellendorf et al. | 358/296 |
| 4,315,285 | 2/1982 | Sommer et al. | 358/280 |
| 4,342,050 | 7/1982 | Traino | 358/256 |
| 4,342,052 | 7/1982 | Rackley et al. | 358/287 |
| 4,347,785 | 9/1982 | Chase et al. | 101/1 |
| 4,357,633 | 11/1982 | Buechler | 358/299 |
| 4,363,037 | 12/1982 | Taudt | 358/296 |
| 4,394,693 | 7/1983 | Shirley | 358/298 |
| 4,437,122 | 3/1984 | Walsh et al. | 358/166 |
| 4,450,486 | 5/1984 | Buechler | 358/299 |
| 4,451,856 | 5/1984 | Buechler | 358/299 |
| 4,503,468 | 3/1985 | Serinken et al. | 358/256 |
| 4,603,391 | 7/1986 | Inoue et al. | 364/474 |
| 4,612,584 | 9/1986 | George et al. | 358/299 |
| 4,678,976 | 7/1987 | Inoue | 318/577 |
| 4,683,499 | 7/1987 | Kuwabara | 358/264 |
| 4,683,500 | 7/1987 | Kitamura et al. | 358/280 |
| 4,691,229 | 9/1987 | Colditz et al. | 358/76 |
| 4,691,238 | 9/1987 | Yamada | 358/280 |
| 4,700,235 | 10/1987 | Gall | 358/283 |
| 4,800,287 | 1/1989 | Green, Sr. et al. | 356/380 X |
| 4,944,593 | 7/1990 | Kalstroem et al. | 356/379 |
| 4,972,323 | 11/1990 | Cauwet | 364/474.29 |
| 5,029,011 | 7/1991 | Fraser | 358/299 |
| 5,036,403 | 7/1991 | Hupka et al. | 358/299 |
| 5,229,861 | 7/1993 | Nozaka et al. | 358/299 |
| 5,293,426 | 3/1994 | Wouch et al. | 382/1 |
| 5,329,215 | 7/1994 | Fraser et al. | 318/603 |
| 5,402,246 | 3/1995 | Seitz et al. | 358/299 |
| 5,416,597 | 5/1995 | Mubaslat | 358/299 |
| 5,422,958 | 6/1995 | Wouch et al. | 382/141 |
| 5,426,588 | 6/1995 | Walters et al. | 364/468 |
| 5,438,864 | 8/1995 | Morgan | 356/379 |
| 5,652,804 | 7/1997 | Bronstein et al. | 382/141 |
| 5,652,807 | 7/1997 | Bronstein et al. | 382/141 |

OTHER PUBLICATIONS

Heimann GmbH, *Check–Master* (Pamphlet, Date Unknown).

Ahauser Tiefdruck–Gravuren GmbH & Co., *Engraving Tester ET 2000* (Pamphlet, Date Unknown).

Promatec Graphique, *M2B2 modele depose Micro Surface Sarl* (Pamphlet, Antony, France, 1987).

*VIP—Video–Image–Processing* (Pamphlet, Author & Date Unknown).

"Numerical Analysis: A Practical Approach", Melvin J. Maron, p. 188.

"The Image Processing Handbook", John C. Russ, pp. 105–113 (1992).

"Numerical Recipes in C: The Art of Scientific Computing", William H. Press, Brian P. Flannery, Saul A. Teukolsky and Wiliam T. Vetterling; pp.452–460 (1988).

"Datwyler", Max Daetwyler Corporation, 13420 West Reese Blvd., Huntersville, NC 28078, undated brochure.

"Twin–Pilot", Maschinenfabrik Kaspar Waltar GmbH & Co. KG, Plinganserstrasse 22, 8000 Munchen 70, Germany, undated brochure.

"Polishmaster Junior High–Precision Machining and Measuring Center for Rotogravure Cylinders," MDC Max Datwyler AG, CH–3368 Bleinenbach/Schweiz, Switzerland, undated brochure.

"Confocal Scanning Laser Microscope," by Lasertec U.S.A., Inc., 7 pgs., undated.

"Finishmaster Unit for Polishing of Rotogravure Cylinders After Copper or Chrome Plating,"MDC Max Datwyler AG, CH–3368 Bleienbach/Schweiz, Switzerland, undated brochu "Cu–Master Type E Plating Tanks for the Chrome–Plating of Rotogravure Cylinders,"MDC Max Datyler AG, CH–3368 Bleienbach/Schweiz, Switzerland, undated Brochure.

"Cr–Master Type E Plating Tanks for the Chrome–Plating of Rotogravure Cylinders,"MDC Max Datwyler AG, CH–3368 Bleienbach/Schweiz, Switzerland, undated brochure.

JAV, "Getting Better Accuracy with Non–Precision Ball Screws,"American Machinist, Feb. 1993, pp. 50–51.

*The Image Processing Handbook*, by John C. Russ, CRC Press: Boca Baton, FL, 1992, pp. 267–269, 286–287.

*Pattern Recognition Engineering*, by Morton Nadler and Eric P. Smith, John Wiley & Sons Inc., NY, NY, 1993, pp. 109–111, 556, 558.

"How Much Flexo or Gravure Ink do you need?", 2 pgs, Jan. 1973, author unknown.

*Computer Vision* by Dana H. Ballard and Christopher M. Brown, Prentice–Hall, Englewood Cliffs, New Jersey, 1982, Chapters 1–6.

*Automated Visual Inspection* by B. G. Batchelor, D. A. Hill and D. C. Hodgson, IFS (Publications) Ltd., UK and North–Holland (A Division of Elsevier Science Publishers BV), 1985, pp. 56–59, 81–83, 284–287, 290 and 291.

*Digital Picture Processing*, Second Edition, vol. 2, by Azreil Rosenfeld and Avinash C. Kak, Academic Press, Inc., Orlando, Florida, 1982, pp. 84–153.

"Image Processing Algorithms For Industrial Vision" by gerald J. Agin, SRI International, Feb. 9, 1979.

"Video Calipers" Market Memo to P.I.D. dealers by D. J. Joerger, Dec., 19, 1988.

"Video Microscope Measuring Systems", ™ Bradwell International, Inc., Elmhurst, Illinois, 1991.

"Portascan–A New Dimension in Microscopic Measurement", Elmhurst, Illinois, undated brochure.

"Cellscan 90", Bradwell International, Inc., Elmhurst, Illinois, undated brochure.

"Imagen HR 1024 Series High Resolution Video Measuring System", Optech Instrument Corp., Greenvale, New York, Publication No. HR–10, Jan., 1991.

"Portascan–Portascan Gives the Printer or Engraver all the Cell Information He Requires", Scan Systems, Manchester, Brazil, no date. re.

ENGRAVED AREA VOLUME MEASUREMENT SYSTEM AND METHOD USING PIXEL DATA

CROSS-REFERENCE TO RELATED APPLICATIONS

This application is a continuation-in-part of patent application Ser. No. 08/415,638, filed Apr. 3, 1995, allowed Sep. 10, 1997, which is a continuation-in-part of Ser. No. 08/038,679, filed Mar. 26, 1993 now issued as U.S. Pat. No. 5,438,422, which is a continuation-in-part of Ser. No. 08/022,127, filed Feb. 25, 1993, now issued as U.S. Pat. No. 5,424,845; and a continuation-in-part of Ser. No. 08/242,012, filed May 12, 1994, now issued as U.S. Pat. No. 5,492,057; all of which are incorporated herein by reference and made a part hereof.

BACKGROUND OF THE INVENTION

1. Field of the Invention

This invention relates to engraving and, more particularly, to a system and method for determining a volume measurement for an engraved area using an image of the engraved area.

2. Background of the Invention

In the past, an engraver engraved a surface of a workpiece, such as a cylinder, in response to an engraving signal which caused a stylus in the engraver to oscillate in order to engrave a plurality of cells.

Prior to engraving the workpiece, it was not uncommon that an engraving head situated on the engraver was calibrated by engraving selected tone steps called "test cuts" on the workpiece. Unfortunately, the procedures for calibrating the engraving head sometimes resulted in error and incorrect calibration because the measurements of the areas cut were not accurate because they relied solely on the width or a theoretical area for the engraved area, rather than on the actual volume of the area engraved. For example, U.S. Pat. No. 5,293,426 issued to Wouch et al. teaches of measuring a morphological characteristic of each individual cell in a test cut and then computing an average cell dimension and volume per unit area. The averages are compared with desired average values, and engraving head is adjusted in accordance with the comparison. The desired average values can be adjusted to take into account new inks, papers, batch variations in inks and papers, and diamond wear in the engraving head. The volume calculated by the microprocessor shown in Wouch is a theoretical calculation using, for example, a conventional formula for a pyramid.

A problem with measurement systems of the past is that they gave inaccurate and inconsistent approximations of volume because they approximated the volume using a width. For example, energizing an engraving head with an engrave drive signal to engrave an engraved area using a new stylus resulted in one volume. Energizing the engraving head with the same engrave drive signal but with a worn stylus resulted in a second, lower volume. Unfortunately, prior art systems determined volume measurement typically as a width of the engraved area, rather than volume, thereby resulting in inaccurate measurements. This, in turn, resulted in inaccurate calibration of the engraver when these inaccurate measurements were used to calibrate the engraver.

There have also been attempts at generating an actual measurement of an engraved area, for example, by generating a plurality of cross-sectional images of the engraved area and then subsequently calculating an area associated with each image. The areas associated with each of the images are then summed to provide a measurement of the entire area. The drawbacks of this technique is that considerable technology, such as laser microscopes and the like, are required to generate the plurality of images and slices required to measure the volume in this manner.

Still another problem with prior art devices is they did not provide accurate and adequate means for detecting when a stylus was worn beyond levels of acceptability. Typically, the stylus in the engraver would be changed after a set amount of hours use, even if the stylus was not worn beyond acceptable wear tolerance levels. On the other end of the extreme, sometimes a stylus would not be changed before the expiration of the time period, despite the fact that the stylus was worn beyond acceptable levels.

What is needed, therefore, is a simple, yet effective, method and apparatus for capturing an image of an engraved area and generating an actual volume measurement corresponding thereto.

SUMMARY OF THE INVENTION

Accordingly, it is a primary object of this invention to provide a system and method for generating an actual volume measurement for an engraved area.

Another object of the invention is to provide a method and apparatus for determining a plurality of volumes associated with an image of an engraved area, such as an engraved cell or group of cells.

Another object of the invention is to provide a system and method for capturing a single image of an engraved area and subsequently determining a volume of the engraved area using the single image.

Still another object of the invention is to provide a system and method for generating a profile of a stylus used to engrave the engraved area.

Yet another object of the invention is to provide a system and method for utilizing a profile of a stylus, along with an image of an engraved area, to generate an actual volume measurement of the engraved area.

Still another object of the invention is to provide a system and method for adjusting an engrave drive signal in response to an actual measurement of an engraved area utilizing a gamma correction.

Still another object of the invention is to provide a system and method for calibrating an engraver to cause the engraver to engrave cells having desired densities while eliminating undesirable effects, such as "scum dots" arising from, for example, the adjustment of an engrave drive signal.

Another object of the invention is to provide a system and method for alerting an operator when a stylus is worn beyond a desired wear level.

In still another aspect, this invention comprises an engraving system for engraving a workpiece comprising an engraving bed; an engraving head situated on the engraving bed; a driver coupled to the engraving head for driving the engraving head relative to the workpiece when the workpiece is situated on the engraving bed in order to engrave the workpiece; image means associated with the workpiece when the workpiece is mounted on the engraving bed for generating an image of an engraved area engraved by the engraving head on the workpiece and also for generating a pixel grid corresponding thereto, the engraved area comprising a plurality of cross-sectional slices; and processing means coupled to the engraving head for determining a volume measurement for at least one of the plurality of cross-sectional slices of the engraved area using the pixel image.

In another aspect, this invention comprises a volume measurement system for measuring the volume of an engraved area engraved by an engraver comprising an imager for capturing an image of the engraved area; a processor coupled to the imager for generating a pixel grid of the image, for generating a plurality of segment volumes for a plurality of different segments for the image using the pixel grid and also for generating an actual volume measurement using the plurality of different segments.

These and other objects and advantages of the invention will be apparent from the following description, the accompanying drawings and the appended claims.

DETAILED DESCRIPTION OF THE PREFERRED EMBODIMENTS

Figure 1:
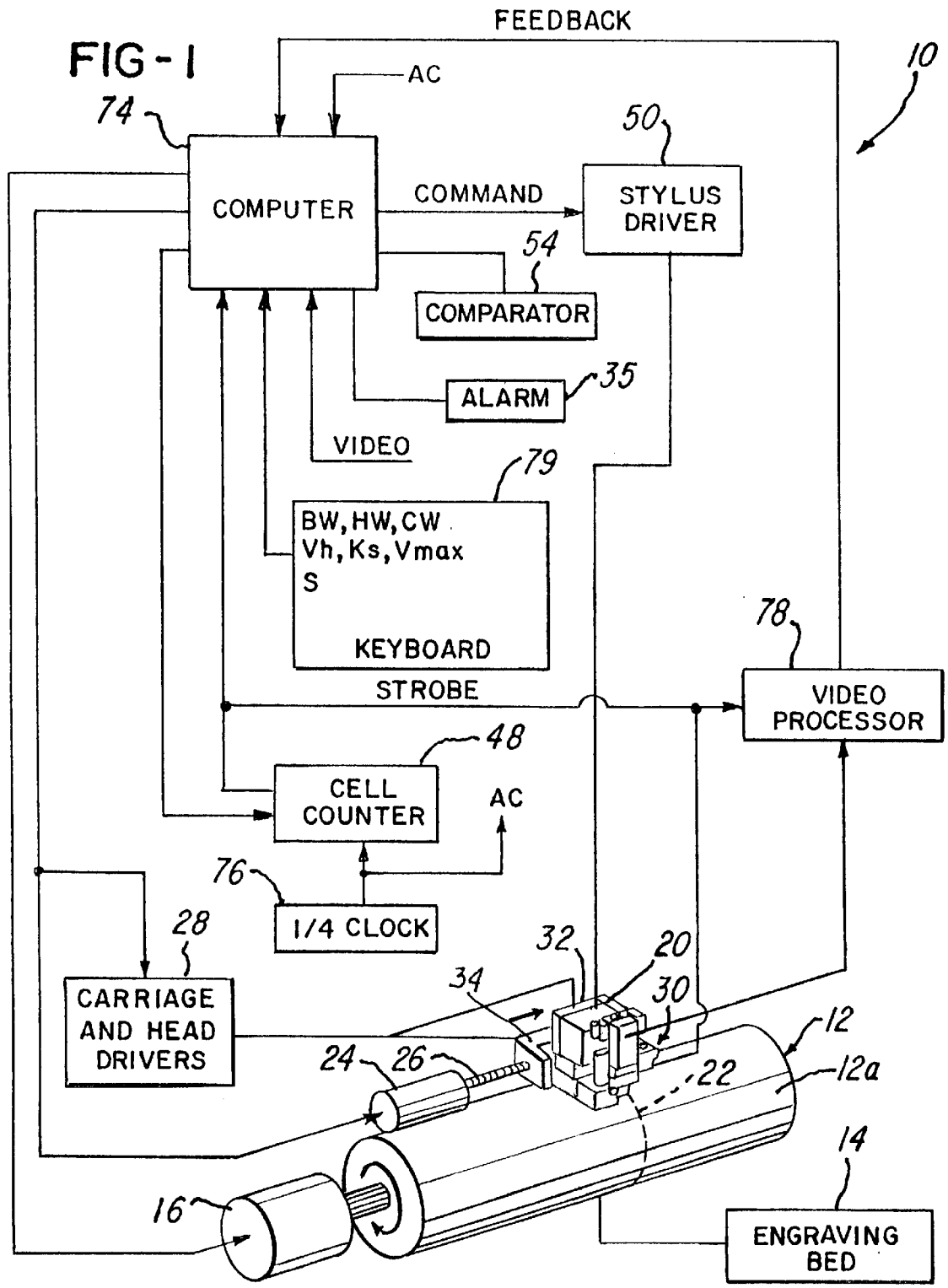
FIG. 1 illustrates a system in accordance with the present invention.

Referring now to FIG. 1, there is illustrated a engraving system 10 for engraving a surface 12a of a cylinder 12 which is rotatably mounted on an engraving bed 14 between a headstock (not shown) and a tailstock (not shown). The cylinder 12 is mounted for rotation by a drive motor 16 and engraving by an engraving stylus 18 (FIGS. 3 and 4C) which is situated on an engraving head 20. The engraving head 20 may be situated on an adjustable support 32 (FIG. 3) which, in turn, is situated on an the engraving bed 14.

During the engraving operation, stylus 18 moves engravingly toward and away from printing cylinder 12 to produce a series of cells or engraved areas to create an engraved track 22. A lead screw motor 24 rotates a lead screw 26 to cause movement of the stylus 18 in a direction parallel to the axis of cylinder 12. If lead screw motor 24 moves continuously, then track 22 will have a helical configuration. Intermittent energization of motor 24 produces a series of spaced circular or cylindrical tracks 22.

Figure 2:
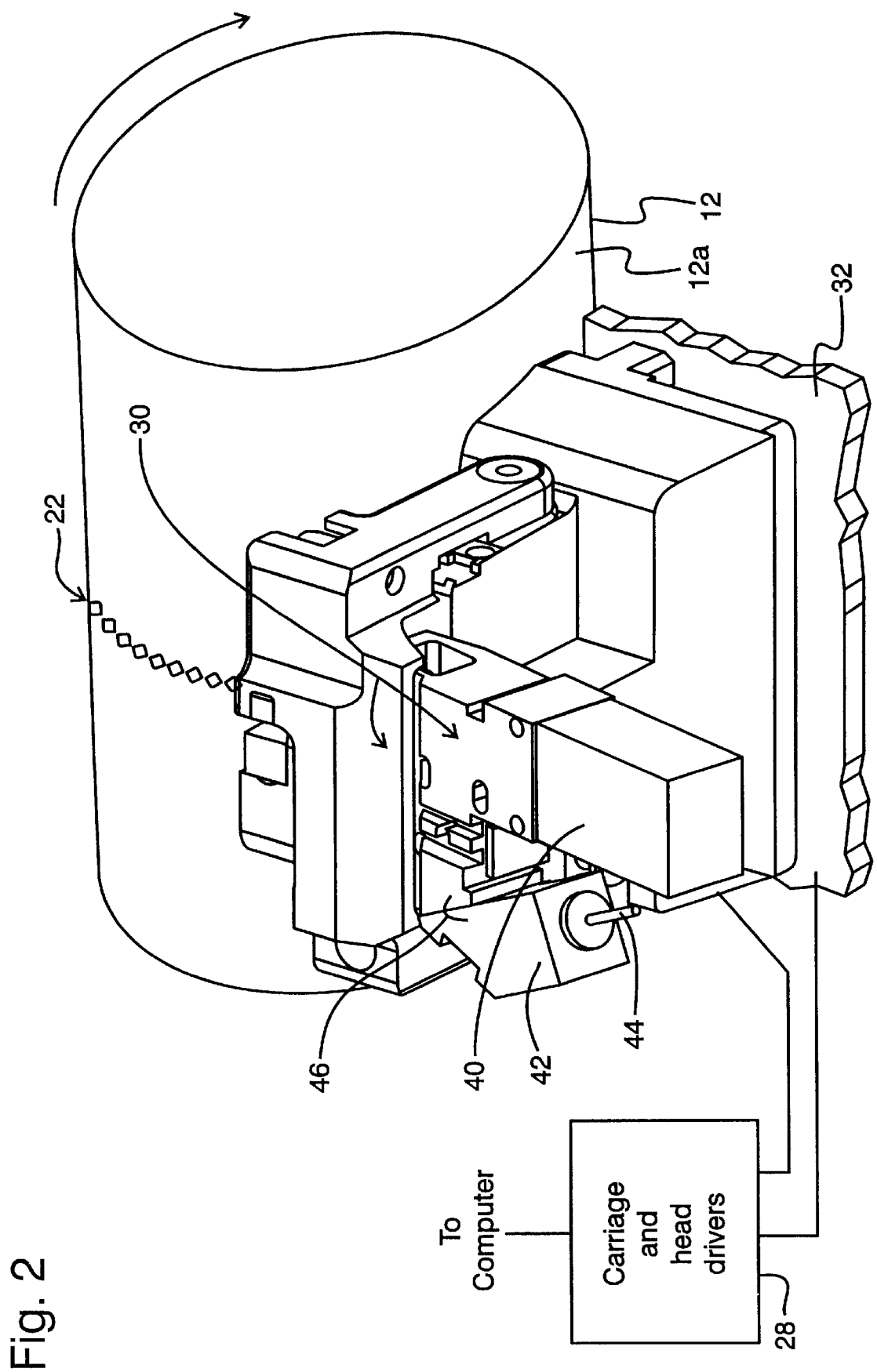
FIG. 2 is a fragmentary view showing details of an engraving head situated on the engraver shown in FIG. 1.
Figure 3:
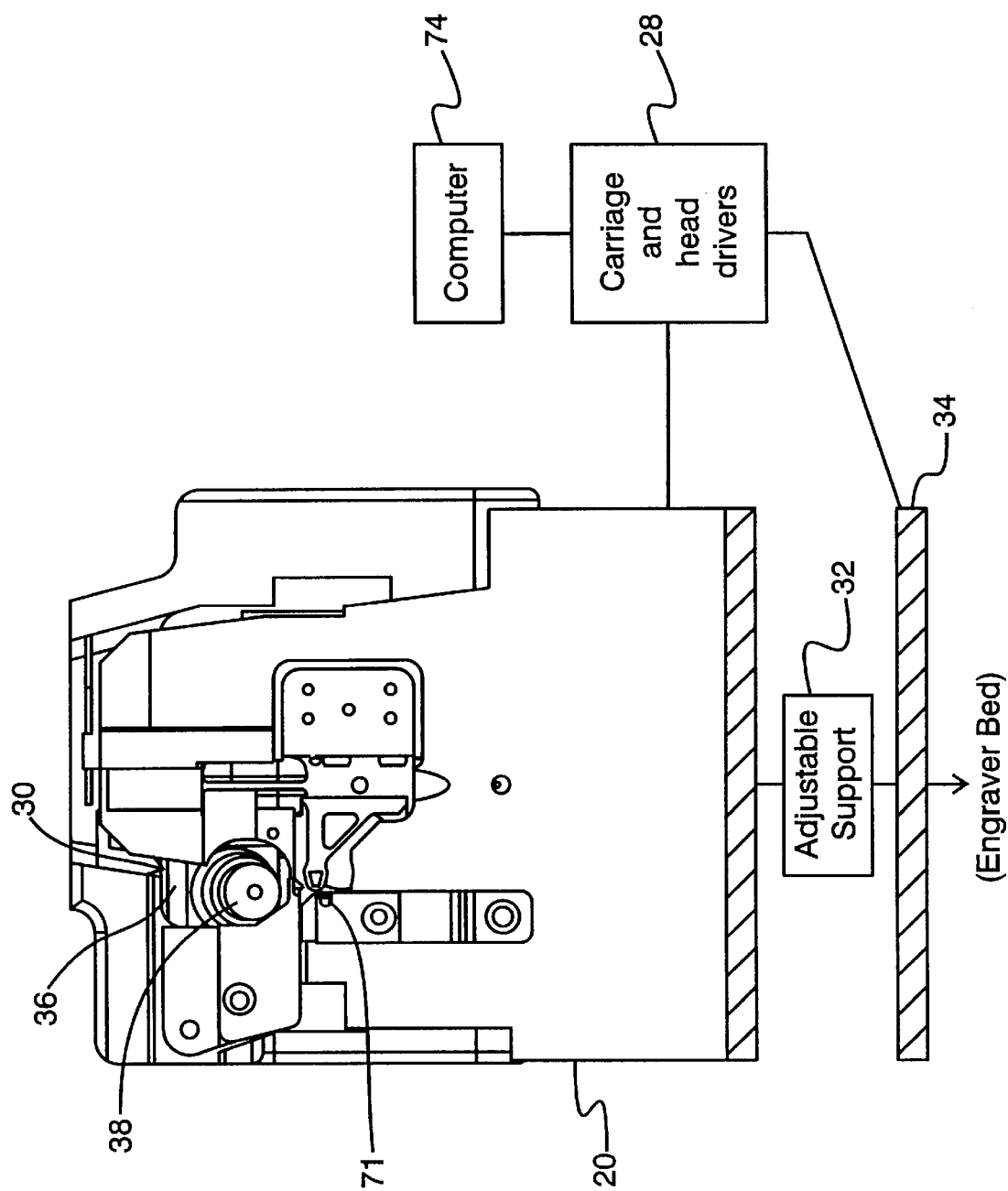
FIG. 3 is another view of the engraving head shown in FIG. 2.

Notice that the stylus 18 is mounted on an engraving head 20 of the type shown and described in U.S. patent application Serial No. 08/415,638 which is assigned to the same assignee as the present invention and which is incorporated herein by reference and made a part hereof. As illustrated in FIGS. 1–3, the engraving system 10 may comprise carriage and head drivers 28 for driving engraving head 20 toward and away from surface 12a and also in a direction which is parallel to the axis of rotation of cylinder 12.

As best illustrated in FIGS. 2 and 3, the engraving head 20 comprises image or video means 30 for viewing and capturing at least one image of a desired position of track 22.

As illustrated in FIG. 2, the engraving head 20 is adjustably mounted on an adjustable support 32 which may be coupled to a carriage 34 which is driven by the carriage and head drivers 28 mentioned above and which are capable of driving engraving head 20 and image means 30 towards and away from cylinder 12.

As illustrated in FIG. 2, the image means, video means, imager or image system 30 comprise a camera 36 (FIG. 3) having a lens 38 capable of automatically focusing on the surface 12a of cylinder 12. It should be noted that it is generally preferable to have the stylus 18 engage the cylinder 12 at an angle which is substantially perpendicular to the surface 12a. Notice in FIG. 3 that the lens 38 of camera 36 of image system 30 is positioned directly above the stylus 18 and substantially in-line with stylus 18 in order to facilitate imaging at least a portion of the engraved track 22 (FIGS. 1 and 2) of engraved areas or cells soon after they are engraved on surface 12a of cylinder 12.

The imager or image means 30 may comprise at least one adjustable tilt support for adjustably supporting the camera 36 at a predetermined tilt angle $\theta$ (FIG. 2). The angle $\theta$ represents the tilt of the camera 36 and may be varied depending on the diameter of the cylinder 12. For example, the adjustable support may comprise an adjustable bracket (not shown) or camera shroud (not shown) for adjustably supporting the camera 36.

The imager 30 also comprises a driver 40 (FIG. 2) for driving the lens 38 (FIG. 3) towards and away from cylinder 12.

The imager 30 further comprises a strobe or illuminator 42 (FIG. 2) which is capable of illuminating surface 12a of cylinder 12 to a plurality of light intensity levels. The illuminator 42 comprises a strobe and fibre optic input 44 which cooperates with imager 30 to strobe flashes through an optical assembly and prism arrangement 46, thereby enabling the strobe 42 to flash through the lens 38 (FIG. 3) of camera 36. Strobe signals for strobe 42 are provided at correct frequency in phase by a cell counter 48 (FIG. 1) to a video processor 78.

Stylus 18 is driven into engraving contact with cylinder 12 by an electromagnetic driver operating in response to an engraving signal (FIG. 1) from a stylus driver 50 illustrated in FIG. 1. The engraving signal and stylus driver 50 may be configured as generally disclosed in Buechler U.S. Pat. No. 4,450,486 which is incorporated herein by reference and made a part hereof.

Figure 4A:
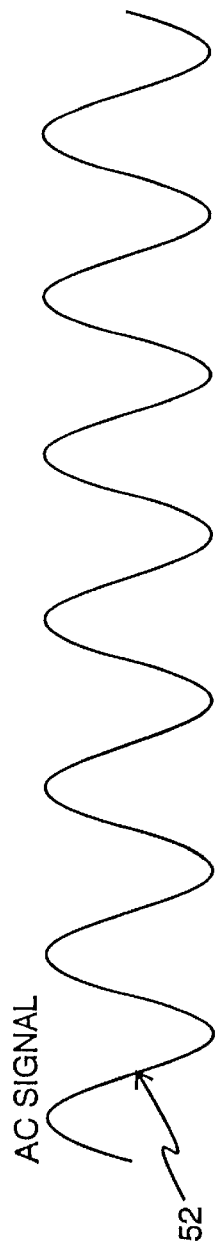
FIGS. 4A–4C are time-correlated schematic illustrations of AC and video signals for controlling an engraving stylus in the engraving movement which results therefrom.
Figure 4B:
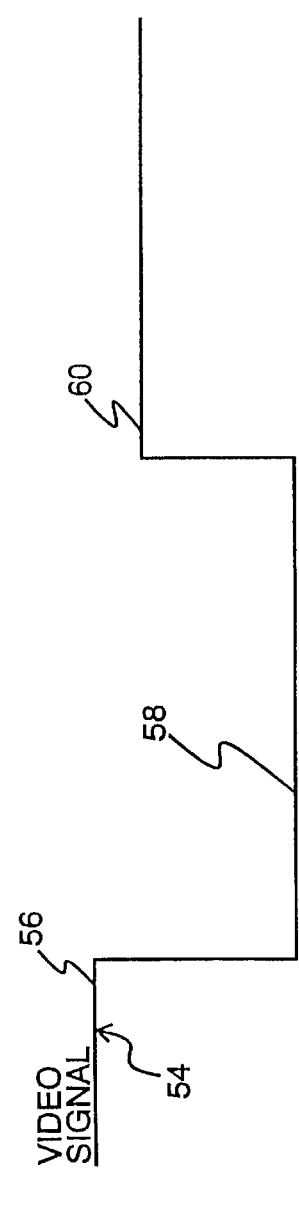
Figure 4C:
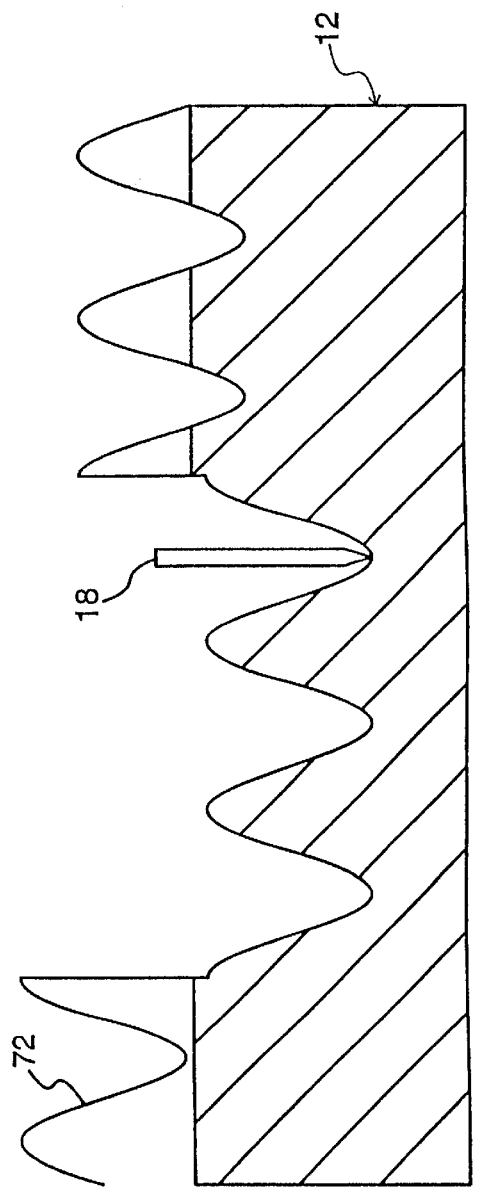

The driving signals for stylus 18 and the resulting vertical movement of stylus 18 are illustrated in FIGS. 4A–4C. The driving signal is obtained by adding the AC signal 52 (FIG. 4A) to the video signal 54 (FIG. 4B). The illustrated video signal 54 has, by way of example, a white video level 56, a black video level 58 and a highlight video level 60. The video signal 54 and the AC signal 52 are combined with an offset (not shown) to provide a combined engrave drive signal 72 which causes the stylus 18 to raise out of contact with the cylinder surface 12a during the entire time the video signal 54 has a white level 56. This combined engrave drive signal 72 may be adjusted further to eliminate or prevent the engraving of areas having a density of less than, for example, three percent as described later herein.

The combined engrave drive signal 72 causes stylus 18 to oscillate in a sinusoidal manner relative to cylinder 12 with a wave length dependent upon the surface speed of the cylinder 12.

A computer 74 transmits lead screw control signal to lead screw motor 24. This signal is adjusted so as to cause lead screw motor 24 to advance stylus 18 in an axial distance.

The AC component signal 52 is derived from an AC input signal generated by a clock 76 and applied to computer 74. The AC input signal may be manipulated or adjusted as described in detail in Ser. No. 08/022,127, now issued as U.S. Pat. No. 5,424,845, which is incorporated herein by reference and made a part hereof.

Another problem is drift. Although computer 74 may be programmed properly and may initially produce engraved areas having correct densities, gain changes, analog components or mechanical changes in the positioning of a shoe 71 (FIG. 3) which supports stylus 18 may require incorporation of an adjustment correction term in the various algorithms as described in U.S. Pat. No. 5,424,845.

In the embodiment being described, the video camera 36 may comprise an auto-focus camera or attachment for enabling it to focus on any size cylinder 12. A video processor 78 (FIG. 1) coupled to said camera 36 and said computer 74 is capable of controlling the auto focus feature so that if, for example, the cylinder 12 is changed to a cylinder having a different radius, then the video processor 78 includes circuitry to ensure any captured image is in focus. Cell counter 48 counts pulses generated by clock 76 at four times the AC frequency. At this frequency, a clock pulse is generated each one-quarter wavelength of engraving stylus oscillation.

As shown in FIG. 1, computer 74 is coupled to stylus driver 50, video processor 78, cell-counter 48, carriage and head drivers 28, as well as motors 16 and 24. In addition, a keyboard 79 is coupled to computer 74 to enable an operator to input various engraving parameters, such as a black cell width, BW; a highlight cell width, HW; a channel width, CW; a video voltage, Vh; a stylus constant, KS; and a black cell voltage, Vmax. A shoe offset, S, may also be entered if desired.

Computer 74 generates various engraving parameters as taught in U.S. Pat. No. 5,438,422 and U.S. Pat. No. 5,424,845 which are incorporated herein by reference and made a part hereof. The various methods for automatically focusing and adjusting camera 36 are performed as generally disclosed in U.S. application Ser. No. 08/415,638 which is assigned to the same assignee as the present invention and which is incorporated herein by reference and made a part hereof.

Figure 5:
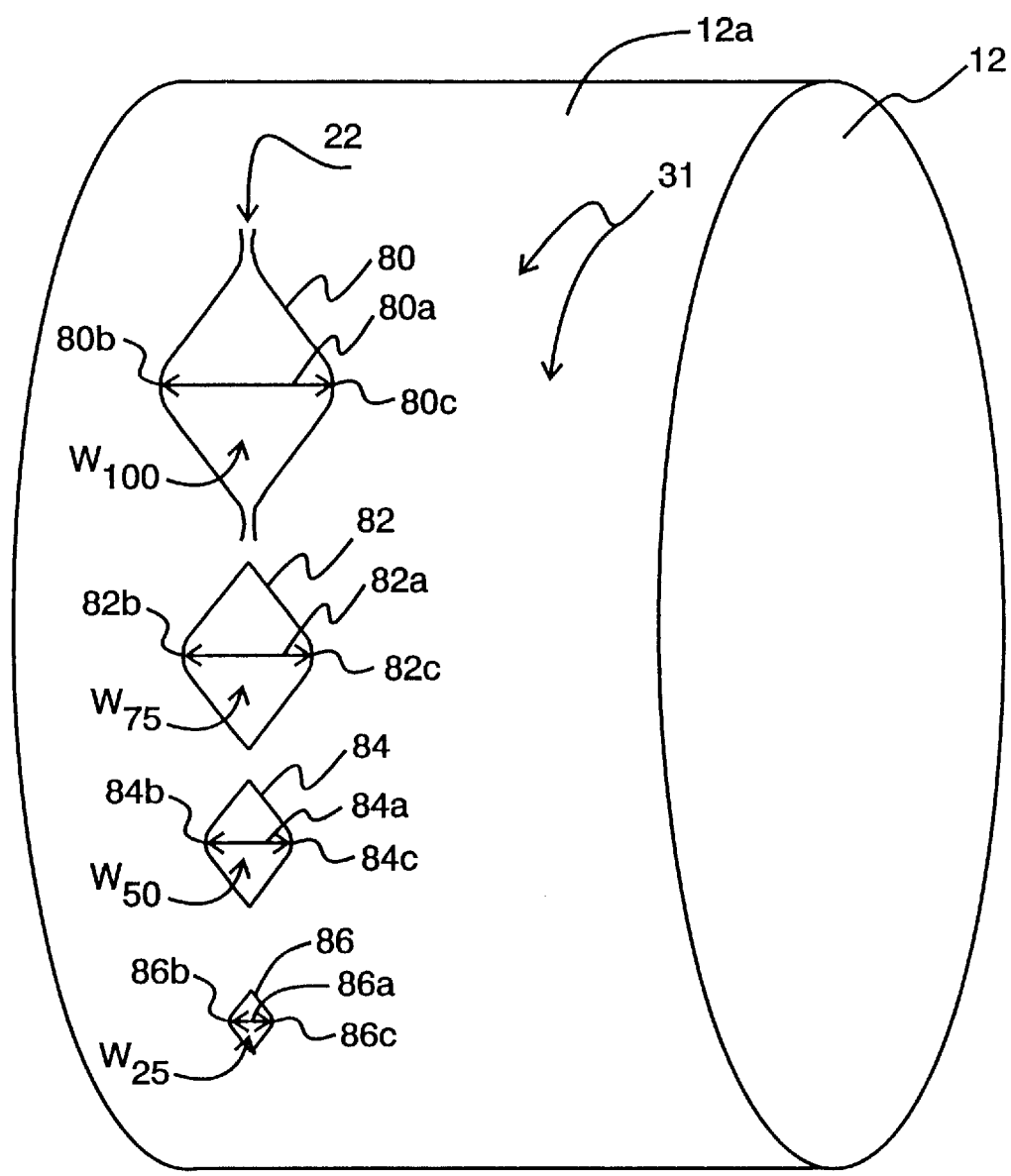
FIG. 5 is a fragmentary view of a cylinder engraved with a plurality of engraved areas having varying densities.

A representative geometric configuration of a test cut for a pattern of engraved areas in track 22 of varying densities is illustrated in FIG. 5 where a plurality of engraved areas having varying densities are shown. In the illustration being described, an engraved area 80 (FIG. 5) comprising a density of 100% or "full black" is shown having a width, $W_{100}$ represented by arrow 80a. Likewise, a pair of midtone cells 82 and 84 comprise widths $W_{75}$ and $W_{50}$ (arrows 82a and 84a, respectively, in FIG. 5). Finally, engraved area 86, which comprises a density of about 25% of full black, is shown having a width, $W_{25}$, represented by arrow 86a.

Figure 9:
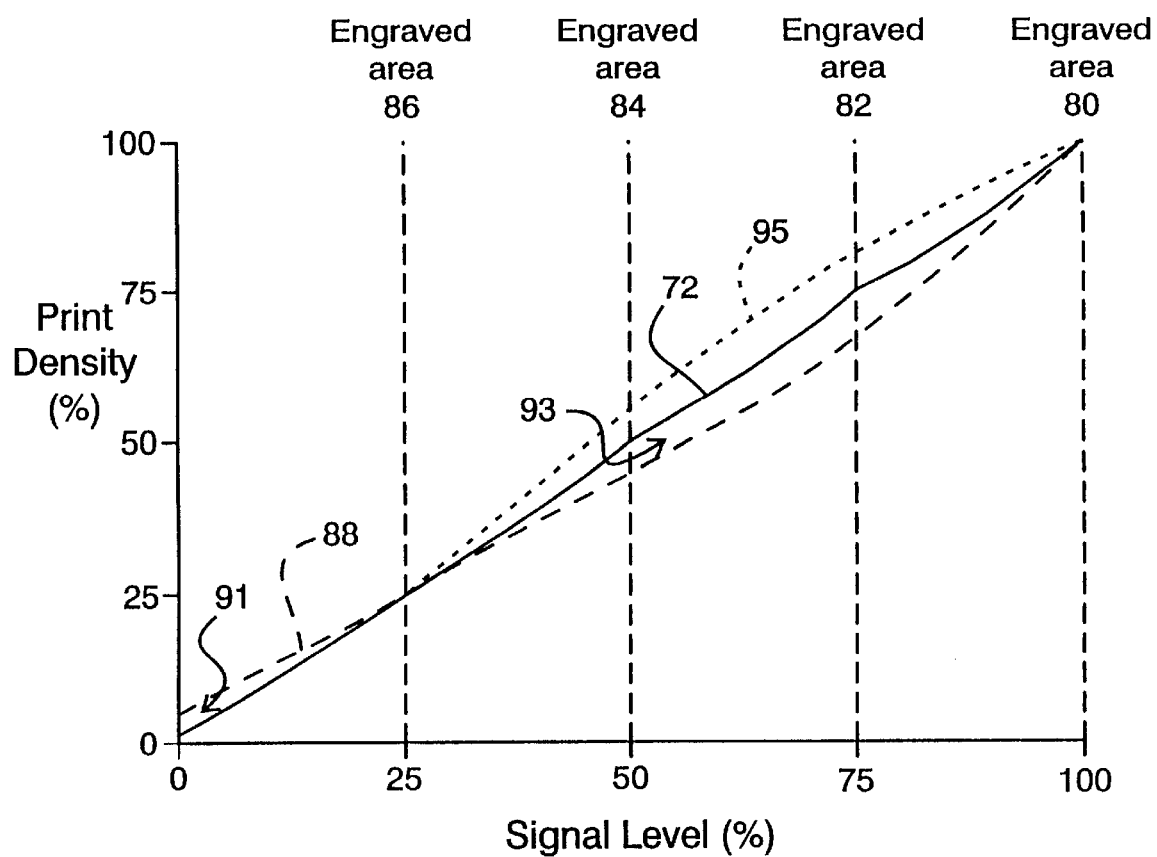
FIG. 9 is a graph showing the difference between desired densities and actual densities and an associated gamma correction curve.

FIG. 9 illustrates a desired correlation or response between drive signal 72 and the desired densities of engraved areas 80–86. In contrast, illustrated by dashed line 88 in FIG. 9, are actual densities for a series of engraved areas engraved in response to engrave drive signal 72 illustrating the effect of a worn stylus 18, for example, which causes the engraving system 10 to engrave areas having densities or volumes which are less than desired. The present invention provides a suitable process for measuring the actual volume and density of an engraved area, such as the engraved areas 80–86 in FIG. 5, which will now be described.

Figure 10:
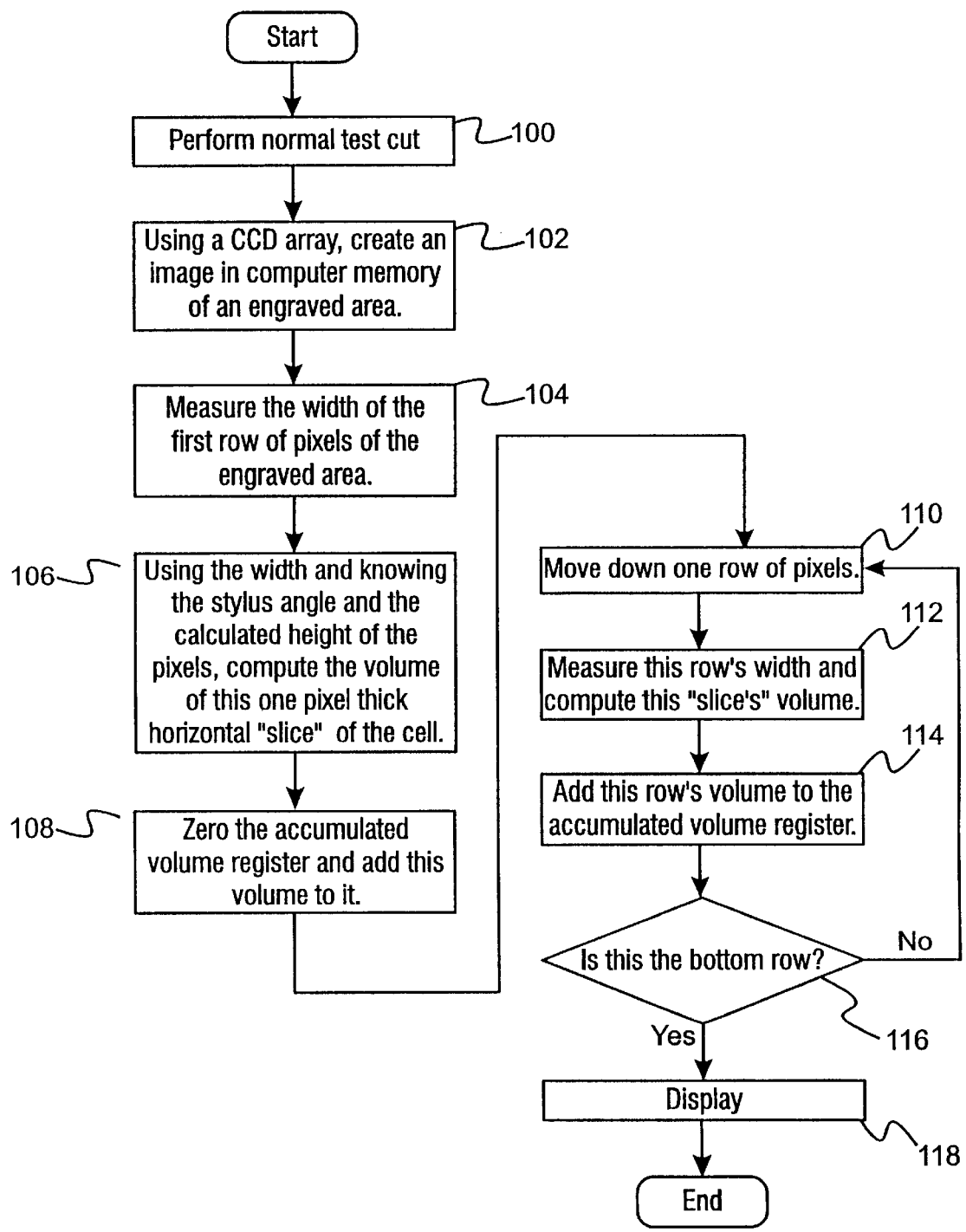
FIG. 10 is a schematic view of a volume measurement procedure utilized by the present invention.

The process will be described relative to FIG. 10 where computer 74 energizes stylus driver 50 with the combined engraving drive signal 72 comprised of AC signal 52 (FIG. 4A) and video signal 54 (FIG. 4B) and, if desired, the offset mentioned above to engrave the test pattern of engraved areas 80–86 (FIG. 5) in track 22 (block 100 in FIG. 10). In this regard, computer 74 selectively energizes carriage and head drivers 28, stylus driver 50, as well as drive motors 24 and 16 to effect engraving a normal test pattern of engraved areas 80–86. Preferably, the test pattern comprises a plurality of engraved areas 80–86 having a variety of densities. In the embodiment being described, the engraved areas 80–86 comprise densities which vary from a 100% full black to a density level of about 25% of full black. It should also be appreciated that the combined drive signal comprises a signal level of 0.0 (or close to 0.0) to 100% enable engraving system 10 to evaluate densities ranging from 0% full black to 100% full black, respectively.

Figure 6A:
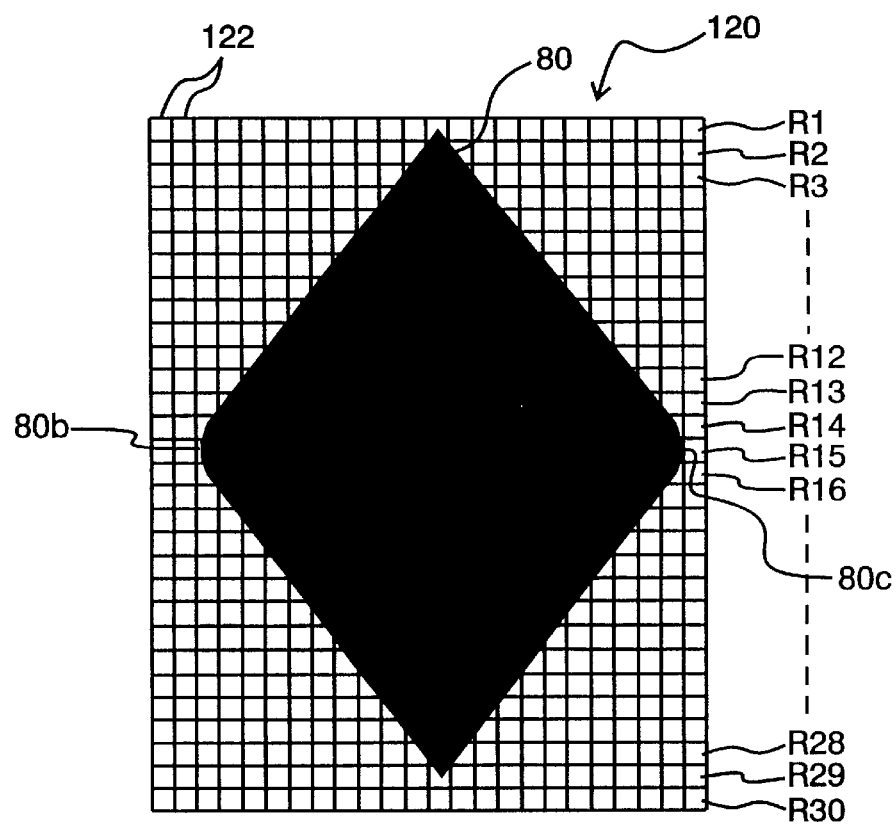
FIG. 6A is a view of an imaged engraved area, showing a CCD array overlayed thereon.

After the test cut is performed, the imager or image means 30 is energized by video processor 78 to capture an image of at least one of the engraved areas, such as engraved area 80 in FIG. 5. In this regard, video processor 78 and/or computer 74 creates a CCD array 120 (FIG. 6A) of the imaged engraved area 80 and stores it in suitable memory (not shown) at block 102 in FIG. 10. FIG. 6A shows the CCD array 120 comprising a plurality of pixels 122. For purposes of illustration, FIG. 6A shows the CCD array 120 for engraved area 80 which, as mentioned earlier herein, comprises a desired density of 100% black. As viewed in FIG. 6A, notice that the image consumes a plurality of rows, R1–R30, of pixels 122 of the CCD array 120.

Figure 6B:
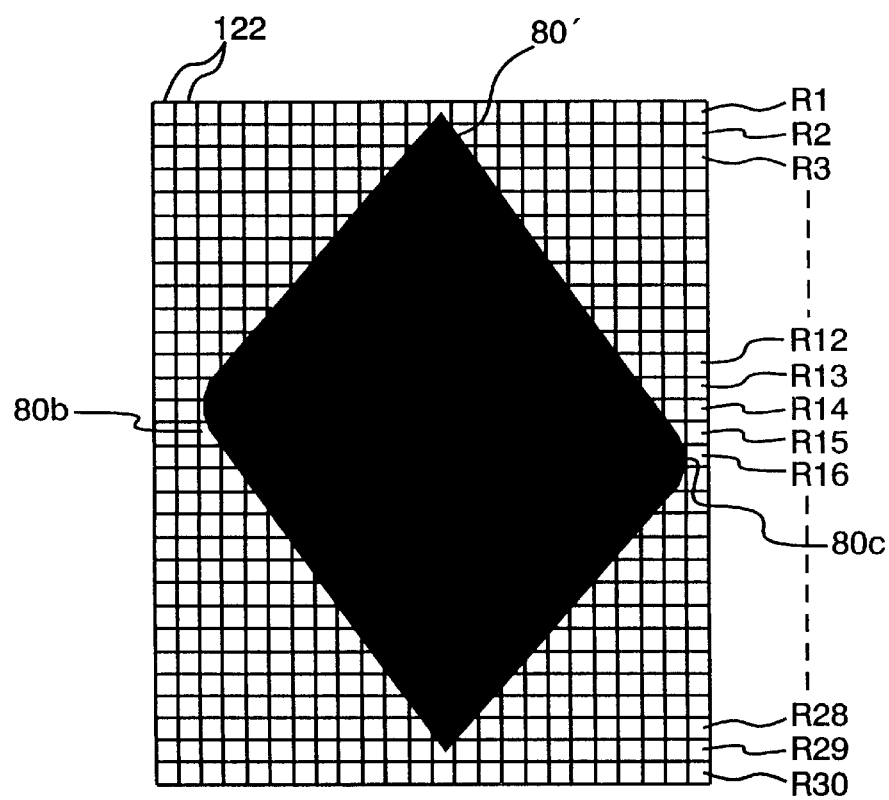
FIG. 6B is a view similar to FIG. 6A of an imaged engraved area which is not symmetrical.

FIG. 6B illustrates another engraved area 80' which is asymmetrical. Advantageously, the features of this invention permit an accurate volume measurement to be obtained for this engraved area.

Figure 7:
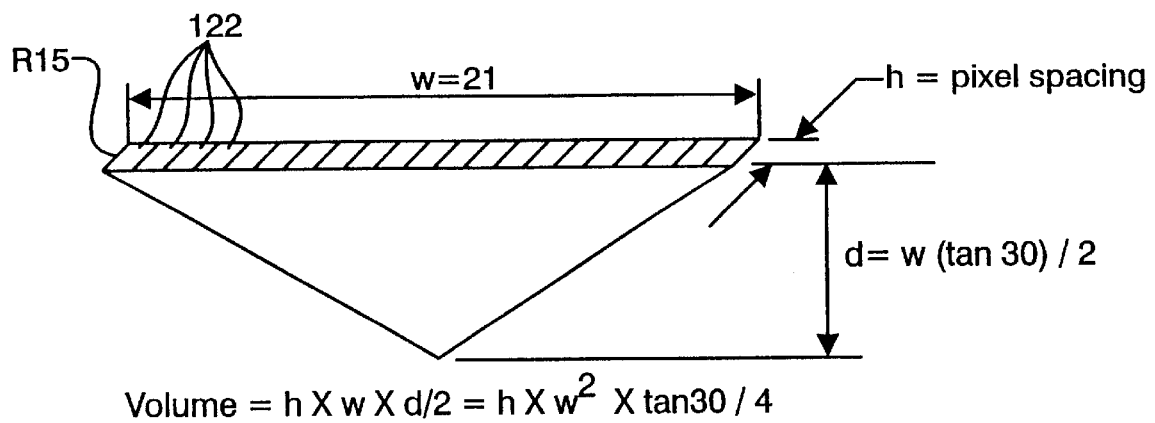
FIG. 7 is a view illustrating a "slice" or row associated with the image shown in FIG. 6.

Regardless of whether the shape of engraved area 80 is of the type shown in FIG. 6A or FIG. 6B, the method continues (block 104 in FIG. 10) to serially measure a width of each "slice" or row, R1–R30, beginning with the first row, R1, of pixels 122 of the engraved area 80. The method of measurement is best illustrated in FIG. 7 where it will be assumed that a measurement for the first fourteen rows, R1–R14, has already been determined and that a measurement for row R15 is currently being determined. It should be appreciated that a measurement is determined for each row R1–R30 which make up or comprise the engraved area 80.

As illustrated in FIG. 7, notice that each row comprises a width which is made up of a plurality of pixels 122. Initially, the shape of the stylus 18 is known because the stylus 18 is not worn and the distance D is known. Because each pixel represents a distance of about 0.7 micron in the embodiment being described, the width, W, is determined by multiplying 0.7 micron by the number of pixels in the row. Thus, the width, W, is determined to be 0.7 micron×21 pixels or 14.7 microns.

The distance, D, may be determined by applying the following equation 1:

$$D = W \tan \frac{(180 - \text{stylus angle})}{2}$$

The volume for this "slice" or row, R15, may then be determined by applying the following equation 2:
Volume=H×W×D/2 or $$H \times W^2 \times \frac{\tan(180 - \text{stylus angle})}{2}$$

Thus, the volume for row R15 may be calculated as $$.7 \times (14.7)^2 \times \frac{\tan(180 - 120)}{2}$$

or 5.94 cubic microns in the illustration being described.

In the embodiment being described, it is presumed that the stylus angle for stylus 18 in this illustration is 120°, but it should be appreciated that this method could be used with styli comprising different angles as well.

At block 108 (FIG. 10), a volume register situated in either video processor 78 or computer 74 is first "zeroed" and the volume calculated at block 106 for row R15 is added thereto.

At block 110, processor 78 processes row data serially from row (e.g., from row R15 to row R16, etcetera). At block 112, a width measurement similar to the measurement determined at block 104 is calculated for the new row, R16, and a volume measurement is determined in the same manner as was determined at block 106. At block 114, this volume measurement is accumulated with the volume in the volume register of processor 78 or computer 74.

At decision block 116, it is determined if the last or bottom row (row R30 in FIG. 6A) has been processed. If it has not, then the routine loops back to block 110 as shown. If it has, then the measurement process is complete and the total volume for the engraved area under evaluation is determined to be the volume in the volume register and is displayed (block 118) on a suitable display (not shown). The total volume measurement has been found to directly correlate to the density of the engraved area 80. Thereafter, the routine is complete.

Figure 8:
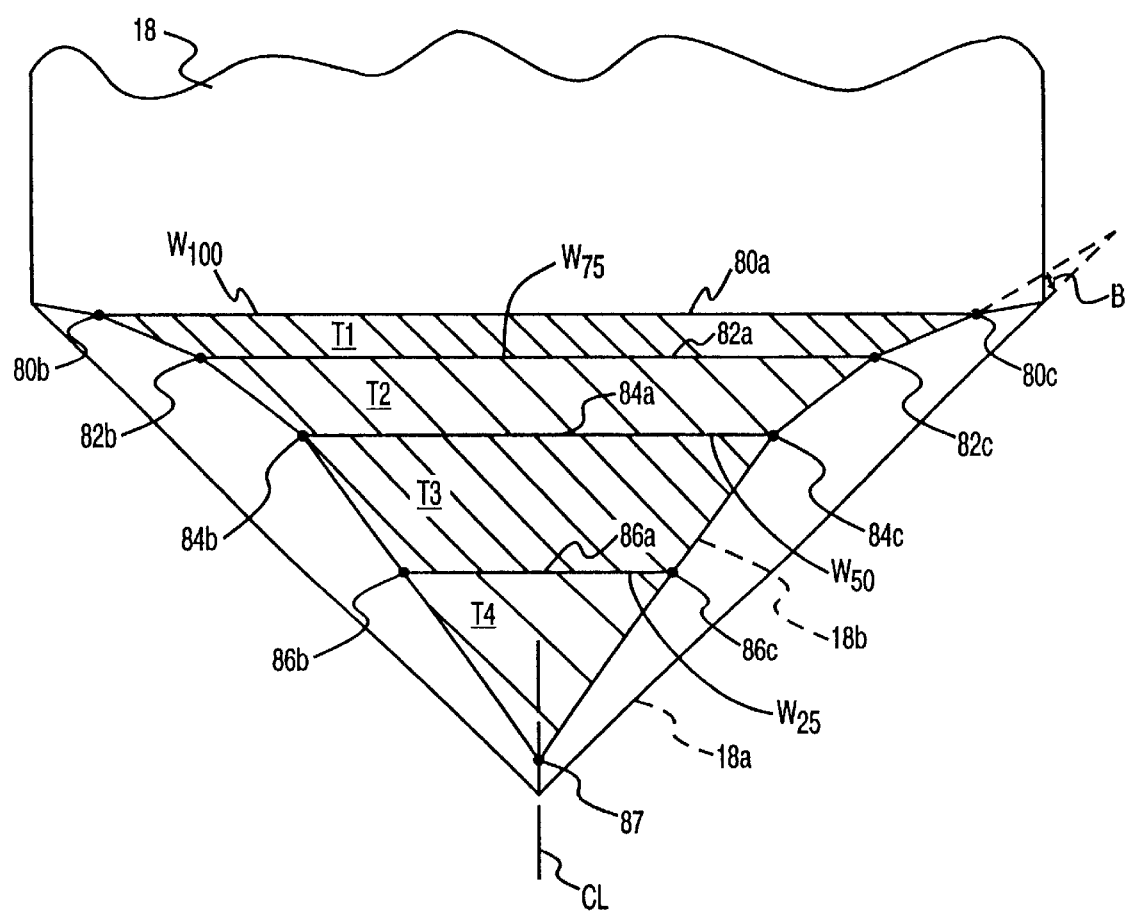
FIG. 8 is a fragmentary view of a worn stylus.

Advantageously, the method and apparatus of the present invention enable a volume measurement for an engraved area, such as engraved area 80 (FIG. 5), to be determined using a single image of the area 80. This invention is also advantageous because it provides means for determining whether stylus 18 has become worn and also for calculating a volume for an engraved area which was engraved using a stylus or tool which is worn. In this regard, FIG. 8 illustrates the stylus 18 having an original cutting or engraving edge 18*a* and a worn cutting or engraving edge 18*b*.

The engraving system 10 comprises profile means for generating a stylus profile of the cutting tool or stylus 18. Once the stylus profile is generated, an actual volume measurement for each cross-sectional "slice" or row may be determined. The actual volume measurement for each "slice" or "row" may then be summed to provide an actual total volume measurement. If the actual total volume measurement deviates from a predetermined or desired volume, then the engraving system 10 can be linearized, adjusted or calibrated to account for such deviation as described below.

Figure 11:
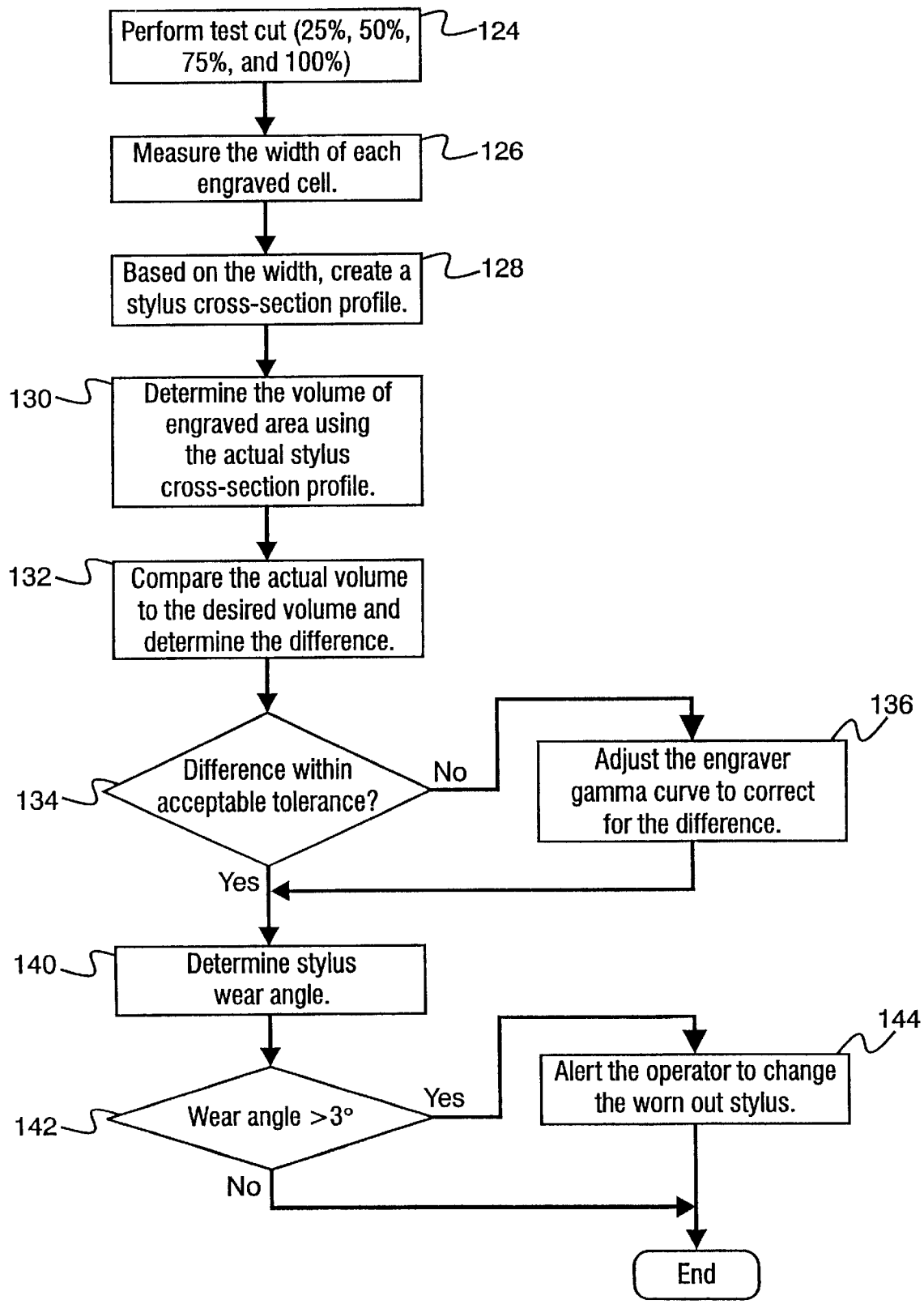
FIG. 11 is a schematic view illustrating, among other things, a stylus wear detection routine in accordance with the present invention.

As illustrated in FIG. 11, engraving system 10 performs a test cut of a plurality of engraved areas of varying densities (block 124 in FIG. 11). At block 126, the maximum width for each of the engraved areas which were test cut at block 124 are measured in the same manner as the measurement generated at block 104 in FIG. 10. Computer 74 and/or video processor 78 create a cross-sectional stylus profile (FIG. 8) using the plurality of width measurements (block 128 in FIG. 11). In this regard, notice the schematic illustration of the stylus profile for stylus 18 generated by computer 74 using the width measurements for the engraved areas shown in FIG. 5. For purposes of comparison, the original stylus shape is shown in dashed line. Notice that a maximum width distance for each engraved area, such as the width $W_{100}$ (FIG. 5) of engraved area 80 represented by points 80*b* and 80*c*, is used. These points 80*b* and 80*c* are plotted along with points 82*b*–86*b* and 82*c*–86*c*, to provide the stylus profile illustrated in FIG. 8. In the embodiment being described, the point 87 represents the tip of stylus 18. The point 87 may be determined by interpolating using previously known points or by engraving an engraved area having a density close to zero, such as five percent.

Once the stylus cross section profile is determined, an actual total volume measurement for an actual engraved area, such as the engraved areas 80, 82, 84 and 86 (FIG. 5) may be determined using the cross-sectional profile. In this regard, notice that a plurality of trapezoids or trapeziums and a triangle are represented by the cross-sectional profile shown in FIG. 8. Thus, the trapezoid represented by points 80*b*, 80*c*, 82*b* and 82*c* may be used to determine the area T1 corresponding to these points. Likewise, an area measurement for the area T2 defined by points 82*b*, 82*c*, 84*b* and 84*c*, and an area measurement for the area T3 defined by points 84*b*, 84*c*, 86*b* and 86*c* is determined by computer 74.

Next, computer 74 and/or video processor 78 determines an area T4 for the triangle defined by points 86*b*, 86*c* and 87.

The area calculations or values for the trapezoid, trapezium or triangle are determined by computer 74 using conventionally known equations and formulas.

Computer 74 and/or video processor 78 then sums the T1–T4 areas to provide a total cross-sectional area value or density for the worn stylus 18. Once the cross-sectional area is determined, the computer 74 and/or processor 78 proceed (block 130 FIG. 11) using the profile to determine a volume for each of the test engraved areas 80–86 (FIG. 5) using the technique described earlier herein relative to FIGS. 6 and 7. In this regard, computer 74 and/or video processor 56 utilize the CCD array 120 to determine the maximum width W for each engraved area, such as engraved area 80, as mentioned earlier herein. Thus, the maximum width associated with engraved area 80 would correlate to row R15 illustrated at FIG. 6A. A corresponding volume is determined for that row R15 as described earlier herein.

For rows preceding and succeeding row R15, computer 74 and/or video processor 78 interpolate the distance d (FIG. 7) using the cross-section profile data generated and illustrated in FIG. 8. Thereafter, a volume measurement for the engraved area 80 may then be determined.

After computer 74 and/or video processor 78 determine a volume measurement for each row as described earlier herein, the volumes are summed to provide an actual total volume measurement for the engraved area 80.

In this regard, computer 74 and/or video processor 78 determines a cross-sectional area for each row R1–R30 (FIG. 6A) using the stylus cross-sectional profile (FIG. 8) mentioned earlier herein. Once this is determined, the total actual volume for an engraved area may be determined as described earlier herein.

FIG. 9 mentioned earlier herein is a print density graph showing the correlation between the engrave drive signal 72 generated by stylus driver 50 and corresponding desired print density. Once the various actual total volumes are determined for each of the engraved areas 80, 82, 84 and 86, their associated densities can be plotted as indicated by line 88 in FIG. 9. It should be appreciated that the volume is directly related to the print density and vice versa because the amount of ink in the engraved area generally corresponds to the print density.

In the embodiment being described, computer 74 comprises a comparator or comparing means 54 (FIG. 1) for comparing the actual volume measurements represented by line 88 to the corresponding desired volume measurements represented by line 72 and computing a difference (indicated by the area 93 in FIG. 9) corresponding thereto. Thus, at block 132 (FIG. 11), computer 74 compares the actual volume to a desired volume and determines the difference. If the difference is greater than a predetermined amount (such as three percent of the desired amount represented by the area under line 72 in the embodiment being described), then computer 74 will apply a gamma correction to correct, adjust, or offset for such difference. To correct for such difference, computer 74 generates and applies an offsetting gamma correction 95 (FIG. 9) to the engrave drive signal 72.

When the engraving system 10 subsequently engraves an engraved area having a density of, for example, of 75% full black, then the computer 74 applies the gamma curve 95 which changes the signal level an appropriate amount in order to cause engraving system 10 to correct the engraved area to the desired density.

At decision-block 134 in FIG. 11, it is determined whether this difference is within an acceptable tolerance level, such as three percent of the desired volume. If it is not, then the procedure continues to block 136 where the computer 74 generates the gamma correction to account for the difference.

At block 140 in FIG. 11, computer 74 determines an angle B (FIG. 8) which is the angle defined by an imaginary line which runs through points 80c and 82c (or any other segments of the same line) and which bisects a line which is co-linear with an original cutting edge 20a of stylus 18. The angle B represents a stylus wear angle and, in the embodiment being described, if the wear angle is greater than three degrees (block 142 in FIG. 11), then computer 34 (block 144 in FIG. 11) may energize an alarm 35 (FIG. 1) to alert the operator to change the worn stylus 18.

Thereafter, the adjustment and linearization of the engraving system 10 and stylus wear detection is complete.

Advantageously, this system, method and apparatus provide means for determining an actual volume for an engraved area using a single image of the engraved area. The volume measurement may then be used to linearize or adjust the engraver 10, detect a worn stylus 18, as well as determine an actual profile of stylus 18. With the actual profile of stylus 18, actual volume measurements can be obtained and the engraving system 10 adjusted accordingly.

Further, the engraving system 10 and method provide means for detecting the wear of stylus 18 and for alerting an operator when the stylus 18 has worn beyond acceptable limits. This invention is particularly useful for measuring asymmetrically-shaped engraved areas; such as engraved area 80' in FIG. 6B, where an accurate width is not easily determined.

It should also be appreciated that features of the present invention may be performed during real-time operation of the engraving system 10, thereby enabling the engraving system 10 to be adjusted to enable the engraving system 10 to engrave engraved areas having densities which more closely approximate desired densities.

As can be seen, a worn stylus 18 can impact the volume error. This, in turn, can adversely impact the quality of the image which will ultimately be printed by cylinder 12 when the cylinder 12 is placed in a printing system. The present invention thereby allows the system to maximize stylus life, and adjust engraving system 10 to account for such volume errors.

In the embodiment being described, it has been found that where the signal is at or near zero sometimes unwanted "swim dots" are created on surface 12a. These may be caused by a worn stylus, variables in the set-up parameters, non-linearities of cutting characteristics and the like. This undesired engraved area density 91 (FIG. 9) has been found to cause small "scum dots" or tiny engraved areas to be engraved on surface 12a of cylinder 12. In order to avoid this problem, the engraving system 10 further comprises means for intentionally distorting the engrave drive signal 72 or adjusted drive signal 95 (FIG. 9) for desired densities, such as densities below three percent. To achieve such distortion the stylus driver 50 (FIG. 1) adds a negative offset 101 (FIG. 12) to the engrave drive signal 72 or 95 as the engrave drive signal 72 or 95 approaches about three percent of the engrave drive signal's maximum in order to pull the stylus 18 away from surface 12a of cylinder 12 quickly. In this regard, the stylus driver 50 comprises a sensor, such as a comparator, which senses the engrave drive signal or gamma-corrected engrave drive signal and determines if it is less than or equal to three percent of the signal maximum. If it is, then the negative offset 101 is added to that portion of the engrave drive signal to account therefor.

Figure 12:
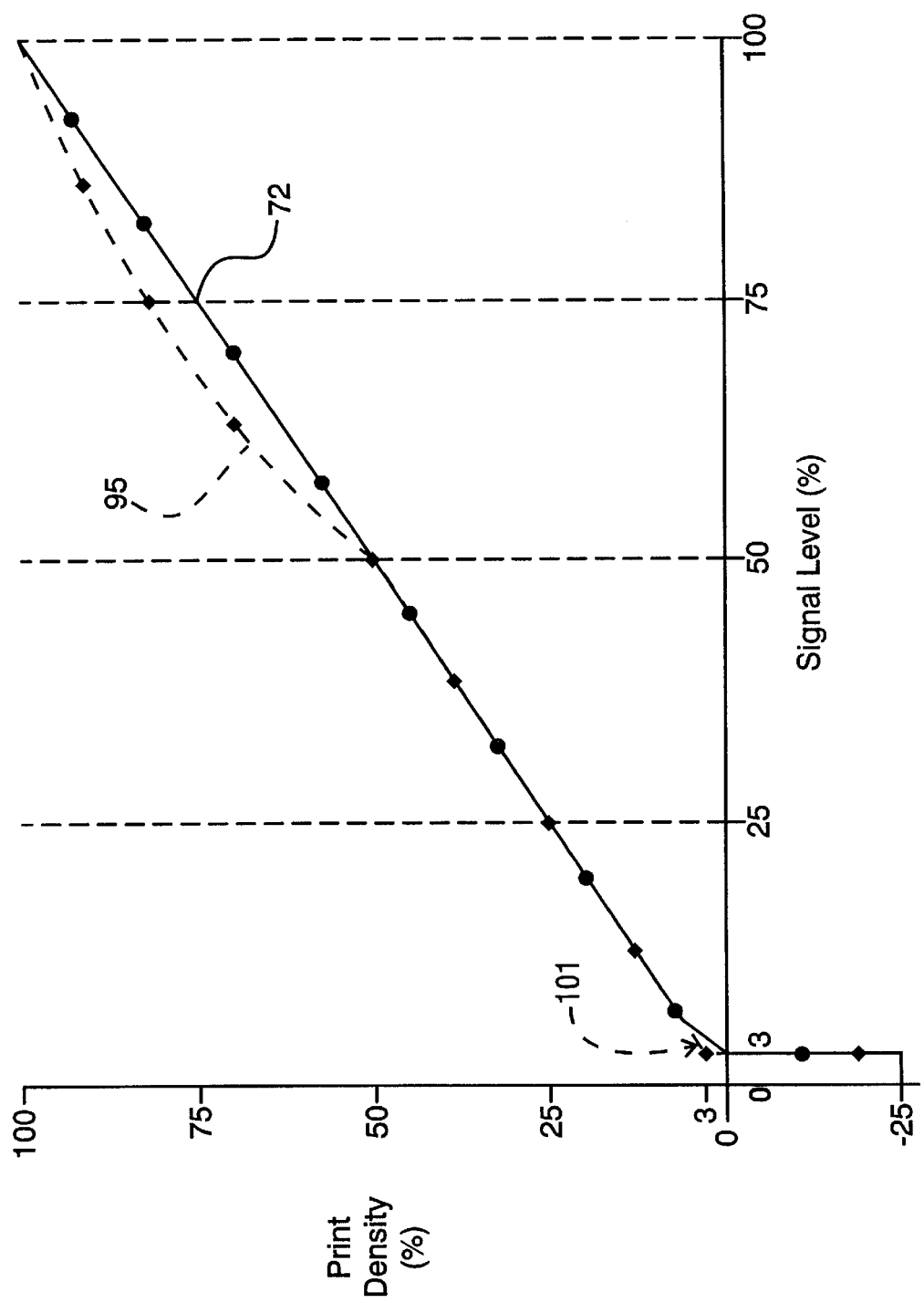
FIG. 12 is a graph illustrating a corrected energizing signal incorporating a "negative offset".

It should be appreciated that computer 34 performs this adjustment either before or after the engrave drive signal has been adjusted with the gamma curve as described relative to FIG. 11. FIG. 12 illustrates the engrave drive signal 72 or 95 and associated density levels after it has been adjusted with the gamma correction as described earlier herein and also after the negative offset 101 has been added.

Notice in FIG. 12, the engrave drive signals 72 and 95 after it has been modified with the gamma correction curve described earlier herein and also after the negative offset 101 has been added to ensure that areas having densities of less than three percent are not engraved.

Advantageously, the adjustments described above provide means for eliminating undesired "scum dots" or small density areas.

This embodiment has been described as generating an alarm when a stylus wear is greater than a predetermined amount. However, it should be appreciated that this invention is also suitable for detecting stylus dimensions which exceed the desired stylus dimension. This may not be uncommon, for example, when a new stylus of unknown dimension is situated on engraving head 20.

Thus, while the methods herein described constitute preferred embodiments of this invention, it is to be understood that, this invention is not limited to these precise methods, and that changes may be made therein without departing from the scope of the invention, which is defined in the appended claims.

What is claimed is:

1. An engraving system for engraving a workpiece comprising:
   an engraving bed;
   an engraving head situated on said engraving bed;
   a driver coupled to said engraving head for driving said engraving head relative to the workpiece when the workpiece is situated on the engraving bed;
   image means associated with the workpiece when the workpiece is mounted on the engraving bed for generating an image of an engraved area engraved by said engraving head and also for generating a pixel grid having a plurality of pixels wherein said engraved area is represented by more than one pixel, said engraved area comprising a plurality of cross-sectional slices; and processing means coupled to said engraving head for determining a volume measurement for at least one of said plurality of cross-sectional slices of said engraved area using said pixel image.

2. The engraving system as recited in claim 1 wherein said processing means comprises:

determining means for determining a number of pixels corresponding to a dimension of said image and also for determining said volume measurement using said number of pixels.

3. The engraving system as recited in claim 1 wherein said processing means comprises:

determining means for correlating a micron distance to one of said pixels in said pixel grid and also for determining said volume measurement using said micron distance.

4. The engraving system as recited in claim 3 wherein said micron distance is less than about 1 micron.

5. The engraving system as recited in claim 1 wherein said engraved area comprises a shape which is asymmetrical.

6. The engraving system as recited in claim 1 wherein said engraving system further comprises:

profile means for generating a stylus profile of a tool situated on said engraving head used to engrave said engraved area;

said processing means being capable of using said stylus profile to determine said volume measurement.

7. The engraving system as recited in claim 6 wherein said processor further comprises:

dividing means for dividing said stylus profile into a plurality of different segments, at least one of which defines a trapezoid.

8. The engraving system as recited in claim 1 wherein said engraving system further comprises the steps of:

profile means for generating a stylus profile of a tool situated on said engraving head used to engrave said engraved area;

said processing means adjusting at least one of said volume measurements if said stylus profile deviates from a desired profile by more than a preselected amount.

9. The engraving system as recited in claim 8 wherein said preselected amount is at least 1 percent.

10. The engraving system as recited in claim 9 wherein said processing means comprises:

determining means for determining a dimension for said engraved area and also for determining said stylus profile using said dimension.

11. The engraving system as recited in claim 10 wherein said dimension is an engraved area width.

12. The engraving system as recited in claim 9 wherein said processing means further comprises:

dividing means for dividing said stylus profile into a plurality of different segments;

said processing means determining a plurality of area measurements corresponding with each of said plurality of different segments;

summing said plurality of area measurements to provide a measured stylus area;

using said measured stylus area to determine at least one of said plurality of area measurements.

13. The engraving system as recited in claim 12 wherein said engraving system further comprises:

an alarm coupled to said processing means for generating an alarm signal if said measured stylus area is less than a desired stylus area.

14. The engraving system as recited in claim 1 wherein said engraving system further comprises:

stylus wear means for determining an angle of wear for a cutting edge of a cutting tool used to engraved said engraved area;

an alarm for generating an alarm signal if said angle of stylus wear varies from a desired stylus angle by more than a predetermined percentage.

15. The engraving system as recited in claim 14 wherein said predetermined percentage is at least 1 percent.

16. The engraving system as recited in claim 1 wherein said processor further comprises:

a comparator for comparing said volume measurement to a desired volume;

adjusting means for adjusting said engraver if said volume measurement varies from said desired volume by more than a predetermined amount.

17. The engraving system as recited in claim 1 wherein said processor adjusts said engraver during real-time operation of the engraver in response to said volume measurement.

18. An engraving system for engraving a workpiece comprising:

an engraving bed;

an engraving head situated on said engraving bed;

a driver coupled to said engraving head for driving said engraving head relative to the workpiece in order to engrave the working piece when the workpiece is situated on the engraving bed;

an imager associated with the workpiece when the workpiece is mounted on the engraving bed for generating an image of an engraved area engraved by said engraving head and also for generating a pixel grid having a plurality of pixels wherein said engraved area is represented by more than one pixel, said engraved area comprising a plurality of cross-sections; and a processor coupled to said engraving head for determining a volume measurement for at least one of said plurality of cross-sections of said engraved area using said pixel image.

19. The engraving system as recited in claim 18 wherein said processor comprises:

a determiner for determining a number of pixels corresponding to a dimension of said image and also for determining said volume measurement using said number of pixels.

20. The engraving system as recited in claim 18 wherein said processor comprises:

a determiner for correlating a micron distance to one of said pixels in said pixel grid and also for determining said volume measurement using said micron distance.

21. The engraving system as recited in claim 20 wherein said micron distance is less than about 1 micron.

22. The engraving system as recited in claim 18 wherein said engraved area comprises a shape which is asymmetrical.

23. The engraving system as recited in claim 18 wherein said engraving system further comprises:

a profile generator for generating a stylus profile of a tool situated on said engraving head used to engrave said engraved area;

said processor being capable of using said stylus profile to determine said volume measurement.

24. The engraving system as recited in claim 23 wherein said processor further comprises:

a divider for dividing said stylus profile into a plurality of different segments, at least one of which defines a trapezoid.

25. The engraving system as recited in claim 18 wherein said engraving system further comprises:

a profile generator for generating a stylus profile of a tool situated on said engraving head used to engrave said engraved area;

said processor adjusting at least one of said volume measurements if said stylus profile deviates from a desired profile by more than a preselected amount.

26. The engraving system as recited in claim 25 wherein said preselected amount is at least 1.0 percent.

27. The engraving system as recited in claim 26 wherein said processor further comprises:

a divider for dividing said stylus profile into a plurality of different segments;

said processor determining a plurality of area measurements corresponding with each of said plurality of different segments, summing said plurality of area measurements to provide a measured stylus area, and using said measured stylus area to determine at least one of said plurality of area measurements.

28. The engraving system as recited in claim 27 wherein said engraving system further comprises:

an alarm coupled to said processor for generating an alarm signal if said measured stylus area is less than a desired stylus area.

29. The engraving system as recited in claim 18 wherein said processor comprises:

a dimensioner for determining a dimension for said engraved area and also for determining said stylus profile using said dimension.

30. The engraving system as recited in claim 29 wherein said dimension is an engraved area width.

31. The engraving system as recited in claim 18 wherein said engraving system further comprises:

a stylus wear determinator for determining an angle of wear for a cutting edge of a cutting tool used to engraved said engraved area;

an alarm for generating an alarm signal if said angle of stylus wear varies from a desired stylus angle by more than a predetermined percentage.

32. The engraving system as recited in claim 31 wherein said predetermined percentage is at least 1.0 percent.

33. The engraving system as recited in claim 18 wherein said processor further comprises:

a comparator for comparing said volume measurement to a desired volume;

an adjuster for adjusting said engraver if said volume measurement varies from said desired volume by more than a predetermined amount.

34. The engraving system as recited in claim 18 wherein said processor adjusts said engraver during real-time operation of the engraver in response to said volume measurement.

* * * * *